March 17, 1964 J. V. O'BRIEN 3,124,892
FISH ATTRACTOR
Filed May 1, 1962

James V. O'Brien
INVENTOR.

BY Eric P. Schellin
Att.

United States Patent Office 3,124,892
Patented Mar. 17, 1964

3,124,892
FISH ATTRACTOR
James V. O'Brien, Bexar County, Tex.
(110 Fairchild, San Antonio 36, Tex.)
Filed May 1, 1962, Ser. No. 191,478
6 Claims. (Cl. 43—42)

This invention relates to a fish attractor. More particularly, this invention relates to a fish attractor which accomplishes its attraction by arranging for stirring the bottom of a body of water containing fish so that the food particles encrusted therein are forced into suspension in the water thereby making the food particles available.

It will be appreciated that a considerable amount of food is normally present in the bottom slime of bodies of water. When the bottom of the bodies of water are stirred, the food becomes re-suspended in the water so that fish may easily obtain the food. The present invention relates to a device for providing continuous and automatic agitation of the bottom of lakes and the like which will thereby uncover food particles for fish that may be present. By maintaining the device in a particular locality, fish will easily be trained to spend considerable time in the area in order to investigate the nature of the agitation and at the same time provide the fish with a feeding ground. As the fish become trained to feed in certain areas, fishermen will be able to fish in those areas with more success than would otherwise be possible.

Accordingly, it is the primary object of the present invention to provide a fish attractor and feeder.

It is another object of the present invention to provide an inexpensive and relatively simple device for agitating the bottoms of bodies of water.

It is another object of the present invention to provide a fish attractor which also has the dual function of both agitating the bottom of bodies of water and of attracting the fish thereto.

With the foregoing and other objects in view, the invention will be more fully described hereinafter, and will be more particularly pointed out in the claims appended hereto.

In the drawings wherein like symbols refer to like or corresponding parts through the several views.

Figure 1:
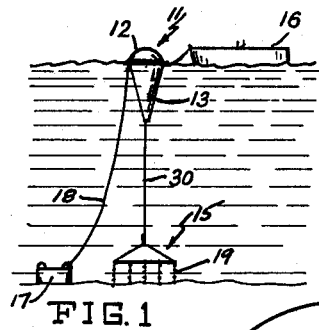
FIGURE 1 represents a general portrayal of the invention in use.

Now turning to FIGURE 1, it will be seen that the present invention concerns a float shown generally by reference numeral 11. The float has a cap 12 and a lower envelope 13 therebeneath having a conical configuration. A line 30 connects the floating mechanism 11 to an agitator shown generally by reference numeral 15. The float 11 may act as a tie-up means for boat 16. Additionally, an anchor 17 is tied to the float through line 18. A plurality of chains 19 reach to the bottom of the body of water. As the float 11 moves due to the wind at the surface of the body of water or due to currents in the water the chains will be dragged to and fro across the bottom of the body of water thereby agitating the same and providing for suitable attraction.

Figure 2:
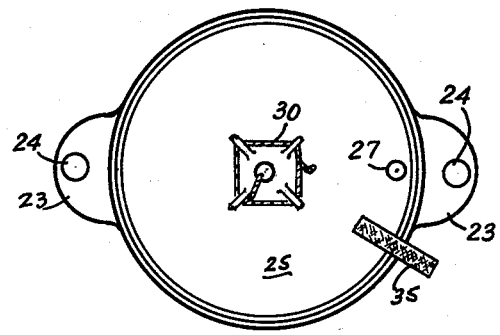
FIGURE 2 is a top view of the float mechanism with the dome cap removed therefrom exposing the inside portion thereof.
Figures 3, 4:
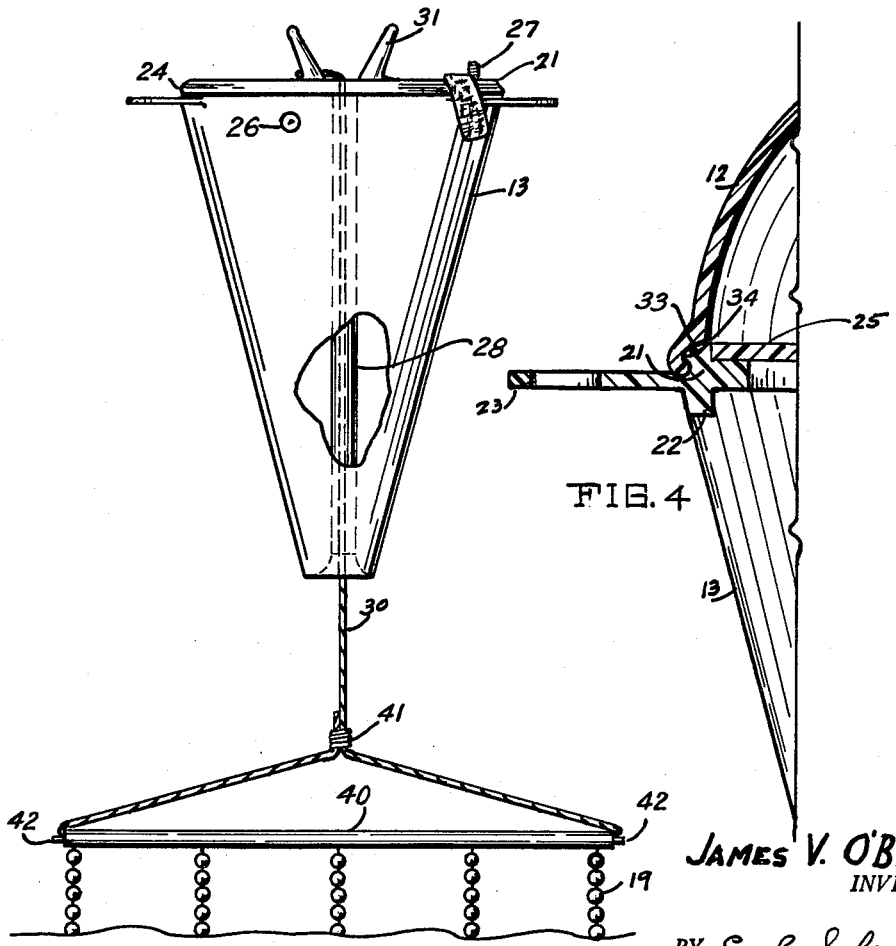
FIGURE 3 is a larger side view of the device with the cap exploded therefrom and having a partially fragmented view in order to observe the inside of the device.
FIGURE 4 is a partial cross-sectional view to show further details of the invention.

Attention is now directed to FIGURE 3 for a more detailed consideration of the elements of the present invention. A main feature is the ring 21 about which the lower envelope 13 is secured as by gluing and the like. Ring 21 may be constructed of thermoplastic material having dimensions so that the ring has suitable strength and can support the other elements. The conically shaped envelope 13 is constructed of a thin thermoplastic material which is secured to a depending flange 22 of ring 21 as seen in FIGURE 4. It will also be seen therefrom that ring 21 has at least two extending ears 23. For a better view of this part of the invention attention is directed to FIGURE 2. It will also be seen that ears 23 have apertures 24 therein. The apertures 24 along with ears 23 provide localities for securing lines for such devices as the anchor 17 or boat 16 as shown in FIGURE 1. On the other hand, the apertures with the ears also provide suitable grasping arrangements in order to lift the float mechanism 11 from the water in order to take it into a boat or the like.

A web partition 25 is cemented into the ring 21. FIGURE 2 shows the dimensions of the web partition. From FIGURE 4 it will be seen that web partition 25 is secured into a recess in ring 21.

The envelope 13 of thin thermoplastic material is ordinarily not self-sustaining. However, the envelope is blown up through either valves 26 located in the side thereof or by means of valve 27 positioned in the web partition 25. An elongated tube 28 of plastic material connects the outer surface of the web partition 25 through inflatable conically shaped envelope 13 along the axis portion thereof and is hermetically sealed to the apex of the envelope 13. It will be seen that a line 30 is threaded through the plastic tube 28. One end of line 30 is connected to the web partition on the upper surface thereof. Cleats 31 are cemented to the web partition concentrically with tube 28. Excess line 30 is wound about the cleats so that more or less of line 30 may be played out through conduit 28 as is desired.

The web partition and the ring is capped with a dome-like cap 12 which has a suitably positioned groove along the inner periphery near substantially the end thereof as can be seen in the cross-sectional view of FIGURE 4 where groove 33 is clearly indicated to mate with annular projection 34 located on an upwardly facing flange portion of ring 21. The cap 12 is of such dimension that a tight fit on the ring is accomplished. In order to provide for removal of the cap from the ring a tag 35 has one end projecting laterally to the annular ring 21 and another end projecting inwardly and is secured by adhesive material or the like to web partition 25. When the cap 12 is in position and it is desired to remove same, an upward tug on tag 35 will release the cap along the edge proximate the tag thereby permitting further movement of the cap away from its mating edge on the annular ring.

Returning to FIGURE 3, it will be seen that line 30 is passed through horizontally positioned tube 40 which may be constructed of a thermoplastic material. After line 30 is threaded to tube 40, it is brought back so that the end of line is secured to line 30 at 41 by suitable tie means. In order to prevent movement of the tube and conversely of the line 30, pegs 42 are wedged into the end portions of tube 40. Depending from tube 40 are a plurality of chains 19. These chains are secured to tube 40 by suitable means such as adhesives and the like. The chains are constructed of a rust-proof metal such as brass, stainless steel or Monel steel and the like. They may be of the familiar or conventional link chain type or of the bead type. The chain lengths should be sufficient to effect a swishing action along the bottom of the body of water. The chains need not be too long inasmuch as more or less of line 30 may be played out from the floating mechanism as is required.

It will be seen that the float of the present invention is unique in that the structure does not take up much room in boats until the envelope 13 is inflated. Consequently, a considerable number of the devices of the present invention may be stored on boats and transported to the final position of use until needed. Furthermore, by constructing the float and various component parts of either thermoplastic material or rust-proof metals, the device is long lasting and is not subject to corrosion. Finally, the float need not be painted inasmuch as the color permeates the thermoplastic material.

Without further analysis, it will be appreciated that the objects of the present invention have been set forth in the foregoing. In other words, it will be seen that the present invention of providing both an attractor for fish and a feeder due to the operation thereof has been carried out in a relatively simple and inexpensive manner.

The foregoing is considered as illustrative only of the principles of the invention. Further, since numerous modifications and changes will readily occur to those skilled in the art, it is not desired to limit the invention to the exact device shown and described, and accordingly all suitable modifications and equivalents may be resorted to, falling within the scope of the invention as claimed.

What is claimed is:

1. A fish attractor comprising a float, said float being partitioned into an upper portion and a lower portion by means of a partition, said lower portion being an inflatable envelope, a line having one end secured to the surface of the partition which is in the upper portion, a conduit extending through said lower portion from said partition to an extremity of said envelope, said envelope being hermetically sealed around the conduit, said line extending through an aperture in said partition and through said conduit extending through said lower portion and an agitation means secured to the other end of said line.

2. A fish attractor comprising a float, said float being partitioned into an upper portion and a lower portion by means of a partition, said lower portion being an inflatable envelope, a line having one end secured to the surface of the partition which is in the upper portion, a conduit extending through said lower portion from said partition to an extremity of said envelope, said envelope being hermetically sealed around the conduit, said line extending through an aperture in said partition and through said conduit extending through said lower portion, a horizontally disposed tube secured to the other end portion of said line and a plurality of spaced apart chains depending from said tube.

3. A fiish attractor comprising a float, said float being partitioned into an upper portion and a lower portion by means of a partition, said upper portion having a dome-like configuration and the partition comprises the base thereof, said lower portion being an inflatable envelope having a conical configuration and the partition comprises the base thereof, a conduit having one end in communication through the partition with said upper portion and passing through said lower portion terminating through the apex thereof, said envelope being hermetically sealed around the conduit, a line having one end secured to the surface of the partition which is in the upper portion, said line extending through said conduit and agitation means secured to the other end of said line.

4. A fish attractor comprising a float, said float being partitioned into an upper portion and a lower portion by means of a partition, said upper portion having a dome-like configuration and the partition comprises the base thereof, said lower portion being an inflatable envelope having a conical configuration and the partition comprises the base thereof, a conduit having one end in communication through the partition with said upper portion and passing through said lower portion terminating through the apex thereof, said envelope being hermetically sealed around the conduit, a line having one end secured to the surface of the partition which is in the upper portion, said line extending through said conduit, a horizontally disposed tube secured to the other end portion of said line and a plurality of spaced apart chains depending from said tube.

5. A fish attractor comprising an annular ring, a web secured in said annular ring enclosing the opening in said ring, said ring having an upwardly facing portion and a downwardly facing portion, a dome-like cap secured to the upwardly facing portion of said annular ring and covering said web, an inflatable envelope having a conical configuration being secured around the base portion thereof to the downwardly facing portion of the ring, a conduit, one end of said conduit passing through said web the other end passing through the apex of said envelope, said envelope being hermetically sealed around the conduit, a line having one end secured to the surface of the web covered by the cap, said line extending through said conduit and agitation means secured to the other end of said line.

6. A fish attractor comprising an annular ring, a web secured in said annular ring enclosing the opening in said ring, said ring having an upwardly facing portion and a downwardly facing portion, a dome-like cap secured to the upwardly facing portion of said annular ring and covering said web, an inflatable envelope having a conical configuration being secured around the base portion thereof to the downwardly facing portion of the ring, a conduit, one end of said conduit passing through said web the other end passing through the apex of said envelope, said envelope being hermetically sealed around the conduit, a line having one end secured to the surface of the web covered by the cap, said line extending through said conduit, a horizontally disposed tube secured to the other end portion of said line and a plurality of spaced apart chains depending from said tube.

References Cited in the file of this patent

UNITED STATES PATENTS

| | | |
|---|---|---|
| 1,192,001 | Ryan | July 25, 1916 |
| 1,469,885 | Britzwein | Oct. 9, 1923 |
| 1,810,565 | Kenely | June 16, 1931 |
| 2,592,441 | Louthan | Apr. 8, 1952 |

FOREIGN PATENTS

| | | |
|---|---|---|
| 551,172 | Canada | Jan. 7, 1958 |
| 677,900 | France | Dec. 19, 1929 |
| 59,391 | Norway | Dec. 5, 1938 |
| 66,759 | Norway | Sept. 20, 1943 |